United States Patent
Tochioka

[11] Patent Number: 6,117,954
[45] Date of Patent: Sep. 12, 2000

[54] POLYMER COMPOSITE MATERIAL AND METHOD FOR PREPARING THE SAME

[75] Inventor: Takahiro Tochioka, Higashihiroshima, Japan

[73] Assignee: Mazda Motor Corporation, Hiroshima-ken, Japan

[21] Appl. No.: 08/724,241

[22] Filed: Sep. 30, 1996

[30] Foreign Application Priority Data

Sep. 28, 1995 [JP] Japan ................................ 7-250961

[51] Int. Cl.⁷ ...................................................... C08F 2/00
[52] U.S. Cl. ................................................ 526/79; 526/78
[58] Field of Search ........................................ 526/78, 79

[56] References Cited

FOREIGN PATENT DOCUMENTS 6-145534  5/1994  Japan .

Primary Examiner—David W. Wu
Attorney, Agent, or Firm—Morrison & Foerster LLP

[57] ABSTRACT

A method for preparing a polymer composite material comprises a step in which a monomer which forms a rigid polymer is compounded with a flexible polymer or a monomer which forms a flexible polymer to form a mixture which is polymerized in a further step by kneading in a molten state. The monomer which forms the rigid polymer is added several times to the polymerized mixture in a repeated series of compounding steps followed by a further polymerization. The compounding amount of the rigid polymer polymerized in the matrix of the polymer composite material can be increased while preventing the agglomeration and enlargement of fibers of the rigid polymer.

8 Claims, 4 Drawing Sheets

POLYMER COMPOSITE MATERIAL AND METHOD FOR PREPARING THE SAME

BACKGROUND OF THE INVENTION

1. Field of the Invention

The present invention relates to a polymer composite material in which a rigid polymer reinforces a flexible polymer at the molecular level and a method for preparing said composite material.

2. Prior Art

There have been developed polymer composite materials in which a reinforcing polymer having a certain rigidity is dispersed uniformly and microscopically in the matrix molecules so as to enhance mechanical properties of the polymer materials. However, said polymer composite materials were basically prepared by mixing the rigid polymer as a reinforcing material into the matrix polymer with solvent and therefore, the uniform mixture was difficult and the problems was occurred such as a decline of strength because the reinforcing material became rough and large.

To solve said problem, we provided a method for preparing a polymer composite material including a rigid polymer having a molecular diameter of 0.07 μm or less dispersed microscopically at the molecular level in the flexible polymer matrix, in which monomer molecules to form a rigid polymer as a reinforcing material are polymerized in the flexible polymer matrix with no solvent in the molten and mixed state (Japanese Unexamined Patent Publication Tokkaihei No. 6-145534).

The compounding ratio of the rigid polymer is needed to be ncreased in the polymer composite material, in order to enhance the strength of the polymer composite material. However, if large quantities of the monomer forming the rigid polymer is added in the matrix at a time from the beginning, the rigid polymer agglomerates and becomes rough. And then, the molecular diameter exceeds the upper limit of the molecular diameter required to achieve the desired reinforcement effect, that is, a cross-sectional diameter of 0.07 μm when cut at right angles to the longitudinal direction of the reinforcing material composed of said rigid polymer.

As disclosed in said published official gazette (Japanese Unexamined Patent Publication Tokkaihei No. 6-145534), in the case that the cross-sectional diameter of said rigid polymer exceeds 0.07 μm, the strength of the polymer matrix material cannot be enhanced. And therefore, the strength of the polymer composite material could not be enhanced according to the method wherein large quantities of the monomer to form the rigid polymer is added in the matrix at a time from the beginning, even if the compounding ratio of the rigid polymer is increased.

THE SUMMARY OF THE INVENTION

Then, it is an object of the present invention to provide a method for preparing a polymer composite material, wherein large quantities of rigid polymer is mixed and said rigid polymer polymerized is dispersed at the molecular level in the matrix without the agglomeration and enlargement of the rigid polymer, thereby, the reinforcement effect being increased due to the increase of the compounding ratio of the rigid polymer and to provide a polymer composite material prepared according to said method.

As a result of sharp study, the invention was achieved in view of the fact that the molecular mobility of the rigid polymer which is once polymerized and crystallized in the matrix decreased extremely, as compared with the monomer non-polymerized, the oligomer non-crystallized and the like and the agglomeration and enlargement of such a rigid polymer during polymerization in the molten and mixed state was difficult to occur.

DETAILED DESCRIPTION OF THE INVENTION

Figure 1:
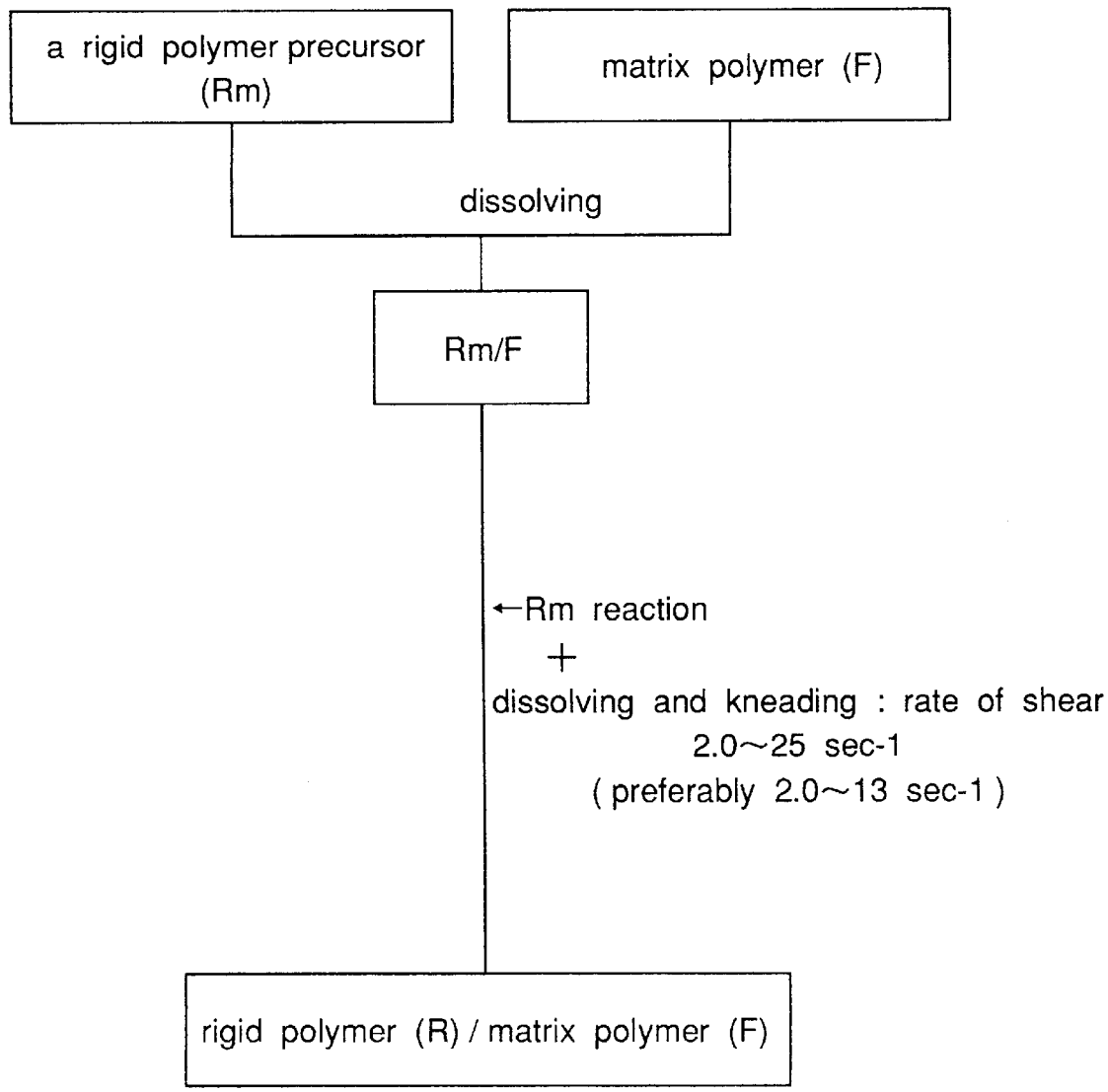
FIG. 1 is a flow chart of one embodiment of the present invention.

According to the present invention, there is provided a method for preparing a polymer composite material, which comprises a step of mixing a monomer to form a rigid polymer into a flexible polymer or a monomer to form a flexible polymer and polymerizing in the molten and mixed state, wherein said monomer to form said rigid polymer is mixed little by little several times and each time said polymerization is performed in order to mix and polymerize the desired amount of the monomer finally, thereby the rigid polymer being polymerized and crystallized without the agglomeration and enlargement of said rigid polymer during polymerization step to increase the compounding ratio thereof.

According to the present invention, the polymer is classified into two kinds, namely, flexible polymer and rigid polymer. What is meant by "rigid" in the present invention is that the bonding which constitute the polymer chain is strong, sectional area occupied by the polymer chain is small and the polymer chain is composed of the molecular structure which is subject to little extension. As far as the characteristics fall under the definition, it may be called rigid but to express it more concretely, it may be expressed by two factors, namely, the theoretical crystal elastic modulus Ec and theoretical strength at breaking σb. The theoretical crystal elastic modulus Ec and theoretical strength σbc be may be defined as follows:

How to obtain theoretical value of crystal modulus of elasticity Ec and theoretical strength σbc at breaking.

First the discussions shall be made on one polymer chain. Force F is applied to the polymer chain with sectional area S and length L. When the polymer chain elongates by ΔL (=L−Lo), tensile modulus of elasticity E is, $$E = \sigma n/\epsilon n = (F/S)/(\Delta L/L) \tag{1}$$

(In the formula, E is tensile modulus of elasticity, σn is tensile stress (n=F/S) and σn is elongation distortion and σn represents ΔL/L).

Theoretical strength b at breaking time is, $$\sigma b = F_{max}/S = (k_1 D/8)^{1/2}/S \tag{2}$$

(In the formula, F max is the maximum value of stress and D represents bonding energy)

Next the polymer crystal shall be discussed. The crystal structure is in the state that the molecular chain is threedimensionally arranged regularly and as dense as possible and in the form that long rod-shaped molecules are bundled. Therefore formula (1) and (2) apply also to the crystals.

Table 1 shows the results of calculation of theoretical value of crystal modulus of elasticity Ec by formula (1) based on the lattice dynamic method.

Theoretical value of tensile strength bc of polymer crystal can σbc calculated from formula (2) but it may be calculated more conveniently by formula (3) given below.

$$\sigma bc = (5.68 \times 10^{-4})/S \quad (3)$$

Generally speaking when certain force is applied to the polymer chain, stress concentrates on the bonded part which is weakest in the main chain and breaking occurs at such point. The weakest bond of all the bonds of the main chain constituting the polymer, that is, the bond which has the lowest covalent bonding energy is C—C bond.

Therefore, when the polymer containing C—C bond is pulled, the polymer chain breaks at such point and therefore from the breaking energy of C—C bond (D-83 Kcal/mol), the formula (3) is derived.

Theoretical strength σbc obtained from formula (3) is also shown in Table 1.

Table 1 also indicates the fibrous modulus of elasticity of each polymer so far obtained. Here, a difference exists between the actual fibrous modulus of elasticity and the strength (i.e., the achieved value) and theoretical value. It is because the actual polymer is composed of crystalline structure and amorphous structure and amorphous structure gives serious influence on the dynamic characteristic of the polymer.

When tensile modulus of elasticity of sample polymer composed of crystalline structure and amorphous structure is Es, modulus of elasticity of crystalline phase is Ec, that of amorphous phase is Ea and degree of crystallinity is Xc and then a serial dynamic model may be as follows:

$$1/Es = Xc/Ec + (1-Xc)/Ea \quad (4)$$

Generally speaking Es>>Ea and therefore formula (4) may be simplified as $$Es = Ea/(1-Xc)$$

It shows that the modulus of elasticity of the sample polymer is mostly determined by the amorphous phase and the influence of the presence of amorphous phase to the dynamic physical property is large and the presence of amorphous phase hinders the attainment of theoretical strength. The flexible polymer such as polyethylene telephthalate, nylon-6 and poly (m-phenylene isophthalamide) which has non-linear structure has the folded polymer chain and it is difficult for them to take the fully extended chain structure and thus the attainment of theoretical value is hindered. However, as for polyethylene which is essentially a flexible polymer, it is possible to make the polymer chain fully extended if it is manufactured by the fibrous crystal growth method or gel spinning super-elongation method etc. and thereby the degree of attainment as shown in Table 1 can be achieved.

As for poly (p-phenylene telephthalamide), poly (p-benzamide) and poly (p-phenylene benzobisthiazol) (with fully extended straight chain structure) which belong to high strength high elasticity polymer, degree of attainment of theoretical modulus of elasticity is sufficiently large but the degree of attainment of strength is small being around 10 percent. That means, various high molecular defects of the polymer are not eliminated and due to such defect, concentration of stress occurs to cause breaking. As for these polymers, not only from the viewpoint of molecular structure but also for physical processing method, study is being continued in order to eliminate said defects and bring the strength closest possible to the theoretical value.

As aforesaid, theoretical values are the values obtained from the ideal structure of polymer crystals, namely, fully extended chain and flawless construction. The rigid polymers used in the present patent are those having high theoretical value and even in the present stage, sufficiently high degree of attainment is realized. It is because the rigidity of their molecular chain is contributing to the materialization of such characteristics.

Based on such findings, when the dynamic physical characteristics of rigid polymer of the present invention are analyzed by the currently available information, the theo-

TABLE 1

Theoretical value and attained value of strength and elasticity of polymer material

| Construction of molecules | Polymer | Sectional area S (nm²) | Tensile modulus of elasticity (GPa) | | Tensile strength (GPa) | |
|---|---|---|---|---|---|---|
| | | | Theoretical value Ec | Attained value Es | Theoretical value σbc | Attained value σbn |
| Flat zigzag chain structure | Polyethylene | 0.182 | 316 | 232 | 31 | 6.0 |
| | Polyvinyl alcohol | 0.216 | 287 | 87 | 26 | 2.1 |
| | Polyethylene terephthalate | 0.204 | 122 | 21 | 28 | 0.9 |
| | Nylon-6 | 0.177 | 244 | 16 | 32 | 1.0 |
| | Poly(m-phenylene-isophthalamide) | 0.238 | 90 | 10 | — | — |
| | Poly(p-phenylene-terephthalamide) | 0.202 | 182 | 131 | — | 3.9 |
| | Poly(p-benzamide) | 0.198 | 163 | 128 | — | — |
| Spiral structure | Polypropylene | 0.344 | 49 | — | 17 | — |
| | Polystyrene | 0.692 | — | — | 9 | — |
| | Polyoxymethylene | 0.172 | 81 | — | — | — |
| Rod structure | Poly(p-phenylene) | 0.234 | 275 | — | — | — |
| | Poly(p-phenylene-pyromeritimide) | 0.242 | 505 | — | — | — |
| | Poly(p-phenylene-benzobisthiazole) | 0.215 | 371 | 320 | — | 3.1 | retical crystalline elasticity modulus, theoretical strength and the attained value of tensile elastic modulus and tensile strength of the actual fiber are as follows:

TABLE 2

| Theoretical value | Attained value |
| --- | --- |
| Theoretical crystalline elastic modulus [GPa] over 150 | Tensile elasticity modulus [Gpa] over 100 |
| Theoretical strength [GPa] over 2.0 | Tensile strength [Gpa] over 2.0 |

An example of the polymer which utilizes the physical conditions of rigid polymer as aforesaid, may be the polymer having repetitive unit structure as shown as follow:

—Ar(X)$_n$Ar'— in the formula, Ar indicates,

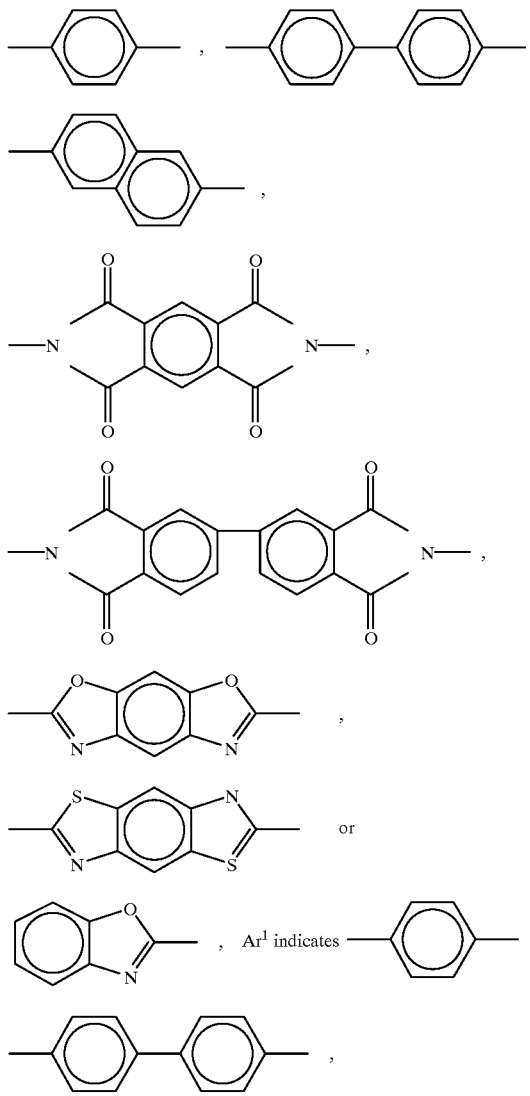

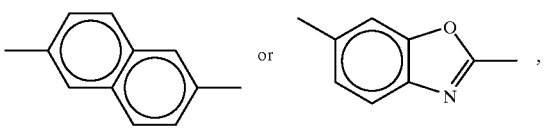

X indicates —CH=N—, —COO—, —N=N(O)—, —CONH—, —N=N—, —C=C—, or —CH=CH— and n indicates 0 or 1.

In the formula, all benzene rings may have substitution group for example alkyl group, halogen, etc. The concrete examples of rigid polymer to be represented by such chemical formula may be poly(p-oxybenzoyl), poly(p-benzamide), poly (p-phenylene telephthalamide), polyazomethyne, poly(p-phenylene pyromeritimide), polybenzobisoxazol, polybenzobisthiazol, polybenzobisthiazol, polybenzoxazol, etc.

The flexible polymer used in the present invention is a general polymer not in the category of the aforesaid rigid polymer. It may be engineering plastics such as nylon 6, nylon 66, polyether sulfon, polysulfon, polycarbonate, poly-butylene telephthalate or multipurpose plastics.

The concrete example of the monomer to form the rigid polymer may be, for example, p-acetoxybenzoic acid, p-hydroxybenzoic chloride, phenyl p-hydroxy-benzoate etc. when the polymer is poly(p-oxybenzoyl) and p-acetaminobenzoic acid, p-aminobenzoic chloride etc. when the polymer is poly(p-benzamide).

Said polymerization step may be kneading in the molten state with no solvent.

A rigid monomer and a flexible polymer may be preferably used as a polymerization material to form a polymer composite material.

In the case that the monomer to form a rigid polymer is mixed several times and each time polymerization is carried out, each polymerization step is preferably performed to the degree that the rigid polymer polymerized is crystallized or to the degree that the temperature of the glass-transition temperature of the rigid polymer polymerized exceeds the temperature of the polymerization in the molten state.

The shear rate of kneading in the molten state is preferably 2.0~25 sec-1 and more preferably 2.0~13 sec-1.

The present invention also provides a polymer composite material prepared according to said method, in which the reinforcing material composed of a rigid polymer is dispersed microscopically at the molecular level in the matrix of the flexible polymer.

The cross-sectional diameter of the reinforcing material when cut at right angles to the longitudinal direction is preferably 0.07 μm or less.

(Embodiment 1 of the invention)

The present invention was achieved in view of the fact that once the rigid polymer was polymerized, the agglomeration and enlargement of the rigid polymer was difficult to occur. In the case that large quantities of rigid polymer is polymerized, the step in which the rigid polymer precursor (Rm) is mixed little by little and polymerized is repeated several times, resulting in a polymer composite material having a high strength and a high elastic modulus in which large quantities of rigid polymer is polymerized while preventing the agglomeration and enlargement of the rigid polymer.

FIG. 1 is a flow chart of one embodiment of the present invention.

According to the present invention, the rigid polymer precursor (Rm), that is, the monomer to form said rigid polymer is added to the flexible matrix polymer (F) and kept at the temperature of 250° C. and so on to dissolve the rigid polymer precursor (Rm) into the matrix polymer (F) at the molecular level.

Then, said mixed material (Rm/F) is kneaded in the molten state in the injection molding machine or the extruder and only the rigid polymer precursor (Rm) is reacted and crystallized to prepare a polymer composite material composed of the rigid polymer (R)/matrix polymer (F). The rate of shear during said kneading in the molten state is preferably 2.0~25 sec-1, more preferably 2.0~13 sec-1.

In the present invention, the step as described above is defined as one step. The rigid polymer (R)/matrix polymer (F) prepared according to said step is used again as an matrix polymer (F), which is a starting material, and the rigid polymer precursor (Rm) is added to said rigid polymer (R)/matrix polymer (F). Then, said step is repeated to increase the compounding ratio of said rigid polymer (R) in the final product, the rigid polymer (R)/matrix polymer (F), while preventing the agglomeration and enlargement of the rigid polymer (R).

The step as described above is carried out to the degree that the polymerized rigid polymer is crystallized or the degree that the glass-transition temperature of the polymerized rigid polymer exceeds the temperature of the polymerization in the molten state.

The compounding ratio of the rigid polymer precursor (Rm) to the matrix polymer (F) is preferably, for example, 3 to 15 parts by weight to 100 parts by weight.

The properties of the polymer composite material prepared according to Embodiment 1 of the present invention will be described as compared with the properties of the polymer composite material prepared according to the conventional method. The polymer composite materials which will be compared with each other is prepared according to Example 1 and Comparative Example 1.

EXAMPLE 1

1.12 g of polyether sulfone as a flexible polymer and 0.124 g of p-acetoxybenzoic acid as a monomer to form a rigid polymer (weight ratio; 90/10) was polymerized in the molten and mixed state at 250° C. for 10 minutes in the miniature injection molding machine (MINI-MAX MOLDER CS-183MMX, Custom Scientific Instruments. INC) to obtain a polyether sulfone/polyoxy benzoyl (weight ratio; 90/10) composite.

Then, 0.081 g of p-acetoxybenzoic acid was added to said polyether sulfone/polyoxy benzoyl (weight ratio; 90/10) composite and the second polymerization in the molten and mixed state was performed at 250° C. for 10 minutes in said miniature injectiorn molding machine to obtain a polyether sulfone/polyoxy benzoyl (weight ratio; 85/15) composite.

Further, 0.075 g of p-acetoxybenzoic acid was added to said polyether sulfone/polyoxy benzoyl (weight ratio; 85/15) composite and the third polymerization in the molten and mixed state was performed at 250° C. for 10 minutes in said miniature injection molding machine. Finally, the sequential polymerization steps as described above provided a polyether sulfone/polyoxy benzoyl (weight ratio; 80/20) composite.

COMPARATIVE EXAMPLE 1

From the first, 1.12 g of polyether sulfone as a flexible polymer and 0.28 g of p-acetoxybenzoic acid as a monomer to form a rigid polymer (weight ratio; 80/20) was polymerized in the molten and mixed state at 250° C. for 30 minutes in the miniature injection molding machine (MINI-MAX MOLDER CS-183MMX, Custom Scientific Instruments. INC). According to said one polymerization step, a polyether sulfone/polyoxy benzoyl (weight ratio; 80/20) composite was obtained.

As for the composites prepared according to said method, the cross-sectional diameters of the particle of the dispersed rigid polymer when cut at right angles to the longitudinal direction were measured by observation with a transmission electron microscope and the average values were calculated to obtain a diameter of the particle which is dispersed in each composite.

The composite materials were injected and molded from said miniature injection molding machine into the test piece mold to give samples for a tensile test. The samples were tested. conditions of the tensile test Tensile tester: MINI-MAX TENSILE TESTER CS-183TE, Custom Scientific Instruments. INC.

Tensile rate: 0.566 cm/min

Strain rate: 0.629/min

Distance between standard lines of the test sample: 0.899 cm

Cross-sectional area of the test piece: $(0.1587/2)^2 \times \pi cm^2$

Measuring temperature: 22° C.

Figure 4:
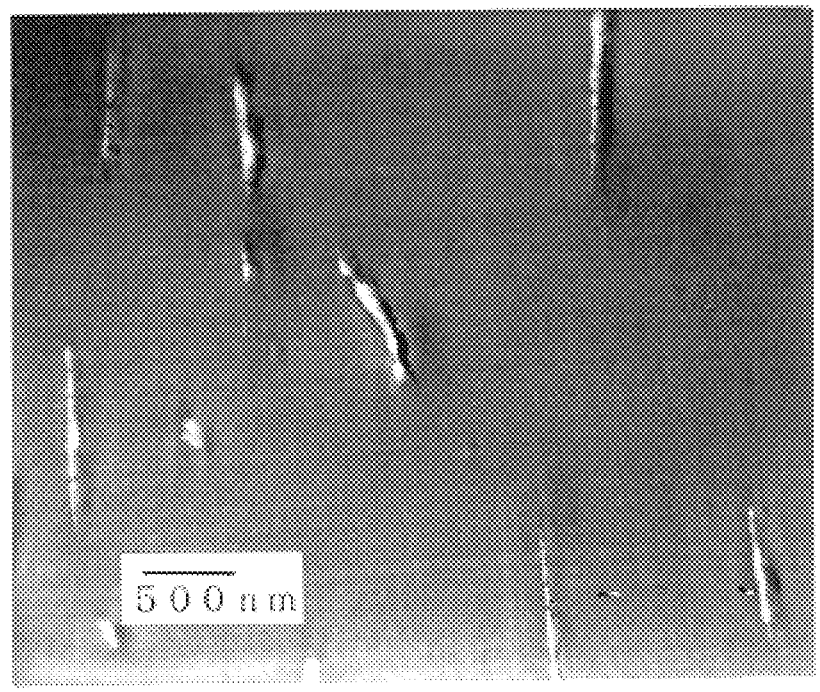
FIG. 4 is a transmission electron micrograph of the polymer composite according to Example 1.
Figure 5:
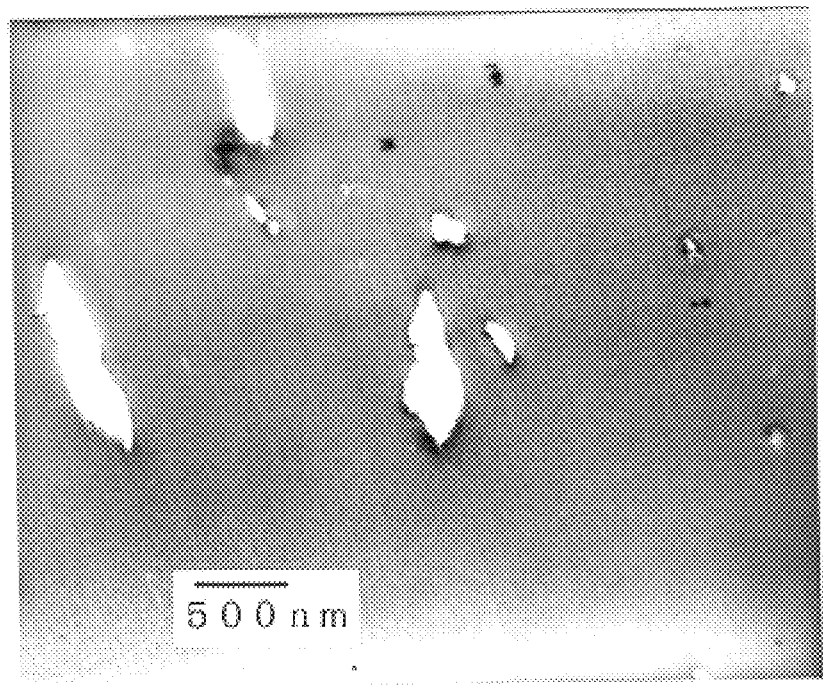
FIG. 5 is a transmission electron micrograph of the polymer composite according to Comparative Example 1.

The results of comparison, diameters of the dispersed particles and tensile strengths of the polymer composites according to Example 1 and Comparative Example 1, are shown in Table 3 and 4. The transmission electron micrographs are shown in FIGS. 4 and 5.

TABLE 3

|  | cross-sectional diameter (nm) |
| --- | --- |
| Comparative Example 1 | 198 |
| Example 1 | 69 |

TABLE 4

|  | tensile strength (MPa) |
| --- | --- |
| Comparative Example 1 | 112 |
| Example 1 | 139 |

Table 3 shows that in the case of Example 1, the agglomeration and enlargement of the rigid polymer is prevented and the cross-sectional diameter is 69 nm, that is, 0.07 $\mu$m or less. On the other hand, in the case of Comparative Example 1 in which a conventional method is used, the cross-sectional diameter is 198 nm and the agglomeration and enlargement of the rigid polymer occurs. As shown in Table 4, the tensile strength of Example 1 is higher than that of Comparative Example 1. Even if the compounding ratio of the rigid polymer is the same (weight ratio: polyether sulfone/polyoxy benzoil=80/20), Example 1, in which the agglomeration and enlargement of the rigid polymer is prevented, is superior to Comparative Example 1 in reinforcement effect.

(Embodiment 2 of the invention)

Figure 2:
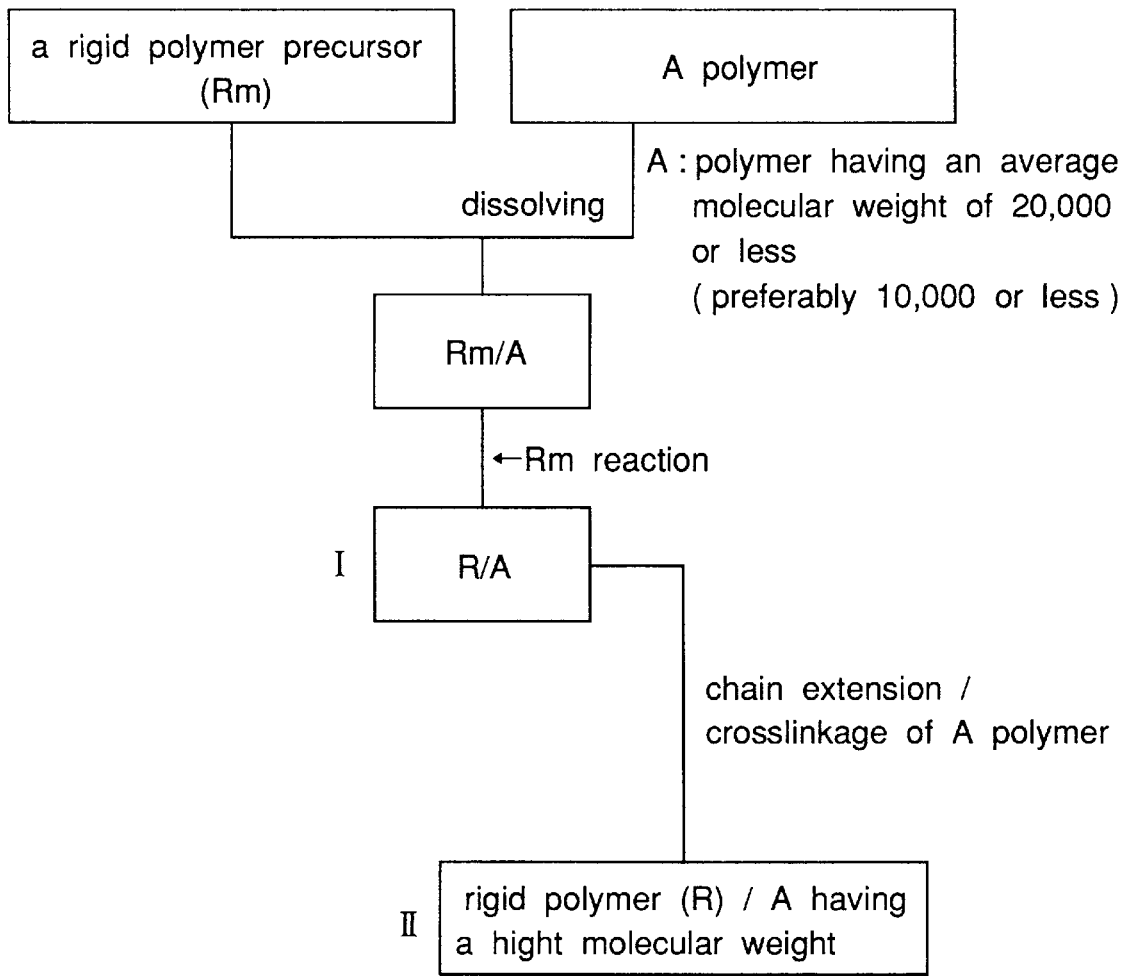
FIG. 2 is a flow chart of another embodiment of the present invention.

FIG. 2 shows another embodiment of the invention.

Namely, the present invention can be achieved by using a polymer having an average molecular weight of 20,000 or less, preferably 10,000 or less, instead of a matrix polymer (F) which is a starting material of the step according to Embodiment 1.

(Embodiment 3 of the invention)

Figure 3:
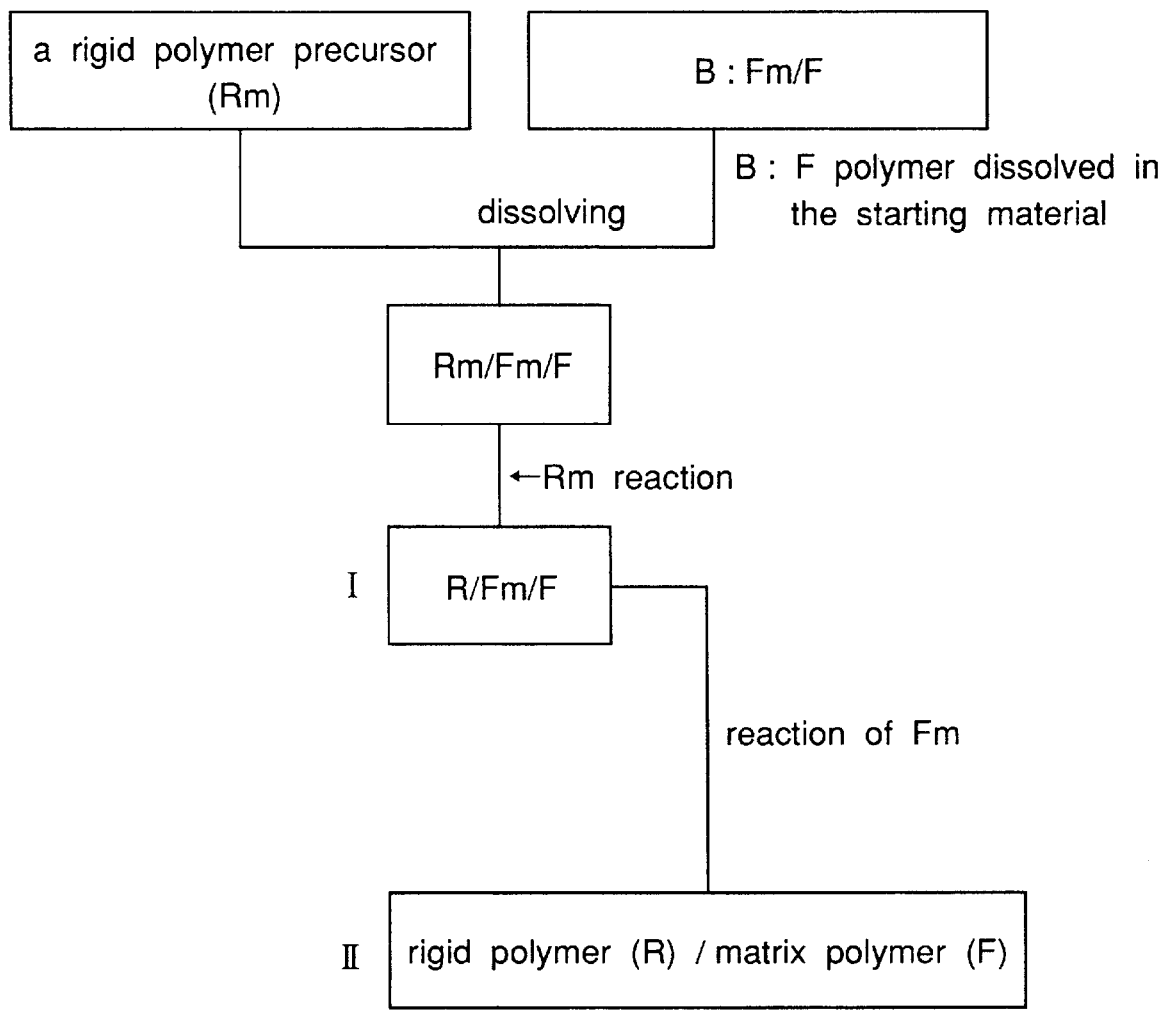
FIG. 3 is a flow chart of a further embodiment of the present invention.

FIG. 3 shows a further embodiment of the invention.

Namely, the present invention can be achieved by using a material in which a matrix polymer (F) is dissolved in the matrix polymer precursor (Fm), instead of the matrix polymer (F) which is a starting material of the step according to Embodiment 1.

According to the present invention, even if large quantities of rigid polymer is mixed into the matrix, the rigid polymer can be dispersed at the molecular level while preventing the agglomeration and enlargement of said rigid polymer. Therefore, the multiplier effect of the reinforcement effect due to the increase of the compounding ratio of the rigid polymer and the reinforcement effect at the molecular level enables the polymer composite to have a higher strength and a higher elastic modulus.

What is claimed is:

1. A method for preparing a polymer composite material which comprises the steps repeated in series of:

blending a monomer which forms a relatively rigid polymer into a relatively flexible polymer or a monomer which forms said relatively flexible polymer, melting the mixture and polymerizing the mixture by means of kneading in the molten state, wherein a desired amount of said monomer which forms said relatively rigid polymer is divided into several fractions to be added in each of said repeated series of steps and said polymerization step is repeated every time each fraction is added, and wherein the monomer which forms said relatively rigid polymer is compounded in each of said repeated series of steps with said mixture in a total compounding ratio of 3 to 15 parts by weight of the monomer which forms the relatively rigid polymer to 100 parts by weight of the mixture.

2. A method for preparing a polymer composite material according to claim 1, wherein said polymerization step is carried out by kneading in the molten state with no solvent.

3. A method for preparing a polymer composite material according to claim 2, wherein the materials used for said polymerization step are the rigid monomer and the flexible polymer.

4. A method for preparing a polymer composite material according to claim 3, wherein each polymerization step for polymerizing a monomer to form a rigid polymer, which is added several times, is carried out to the degree that the polymerized rigid polymer is crystallized or the degree that the glass-transition temperature of the polymerized rigid polymer exceed the temperature of the polymerization in the molten state.

5. A method for preparing a polymer composite material according to claim 1, wherein the materials used for said polymerization step are the rigid monomer and the flexible polymer.

6. A method for preparing a polymer composite material according to claim 1, wherein each polymerization step for polymerizing a monomer to form a rigid polymer, which is added several times, is carried out to the degree that the polymerized rigid polymer is crystallized or the degree that the glass-transition temperature of the polymerized rigid polymer exceed the temperature of the polymerization in the molten state.

7. A method for preparing a polymer composite material according to claim 1, wherein the shear rate of kneading in the molten state is 2.0~25 sec−1.

8. A method for preparing a polymer composite material according to claim 1, wherein the shear rate of kneading in the molten state is 2.0~13 sec−1.

* * * * *